US005305427A

United States Patent [19]
Nagata

[11] Patent Number: 5,305,427
[45] Date of Patent: Apr. 19, 1994

[54] ROBOT WITH VIRTUAL ARM POSITIONING BASED ON SENSED CAMERA IMAGE

[75] Inventor: Yasuyuki Nagata, Saitama, Japan

[73] Assignee: Sony Corporation, Tokyo, Japan

[21] Appl. No.: 883,773

[22] Filed: May 15, 1992

[30] Foreign Application Priority Data

May 21, 1991 [JP] Japan .................. 3-144191

[51] Int. Cl.$^5$ .............................. B25J 9/00
[52] U.S. Cl. ...................... 395/94; 395/86; 395/89
[58] Field of Search .............. 395/86, 89, 94

[56] References Cited

U.S. PATENT DOCUMENTS

| | | | |
|---|---|---|---|
| 4,611,292 | 9/1986 | Ninomiya et al. | 395/86 |
| 4,815,006 | 3/1989 | Anderson et al. | 395/86 |
| 4,942,538 | 7/1990 | Yuan et al. | 395/98 |
| 4,942,539 | 7/1990 | McGee et al. | 395/94 |
| 4,969,108 | 11/1990 | Webb et al. | 395/94 |

Primary Examiner—Allen R. MacDonald
Attorney, Agent, or Firm—Lewis H. Eslinger; Jay H. Maioli

[57] ABSTRACT

A robot numerical control apparatus for following a program and utilizing, in the program, the result of processing an image obtained by a camera attached to an arm of a robot. Either a first command for displacing the manipulating end of the robot to a designated position or a second command for displacing the center of the output image of the camera to the designated position is selectable as a displacement command to actuate the robot. A coordinate transformer is provided for controlling the movement of the robot's arm with pseudo-control in such a manner that when the second command is selected the center of the sensed image is positioned at the manipulating end of a virtual arm measured from the center of the sensed image to the center of the articulation of the robot's arm equipped with the camera, whereby the subject being photographed can be caught exactly at the image sensing center of the camera attached to the robot's arm.

3 Claims, 8 Drawing Sheets

ROBOT WITH VIRTUAL ARM POSITIONING BASED ON SENSED CAMERA IMAGE

BACKGROUND OF THE INVENTION

1. Field of the Invention

The present invention relates to a robot numerical control apparatus capable of following an operation directed from a program and utilizing, in such program, the processed result of an image formed by a television camera disposed in the vicinity of a manipulating end of the robot. And more particularly the invention relates to an improved control apparatus which is capable of shifting the center of the image to a desired position with pseudo control of positioning such image center at the manipulating end of the robot so as to achieve an enhanced precision in the image forming action.

2. Description of the Prior Art

In the latest technical stage relative to assembly of electronic appliances where extremely high precision and miniaturization of component parts are required, it is difficult to ensure the absolute accuracy with regard to the position for feeding the component parts.

In an attempt to avert such difficulties, it is generally customary to adopt a method of installing a television camera in the vicinity of a portion of a robot used for an assembling work, then processing the image obtained from the television camera, and performing the assembly while correcting the feed position and so forth in accordance with the result of such process.

In most of the conventional cases, a robot numerical controller and an image processor are provided individually, and the coordinate system employed for the numerical controller and that for the image processor are independent of each other.

Therefore it is usual to adopt such a technique whereby the robot numerical controller accepts the result of the image processing and, after transforming the same to the coordinate system relevant to the numerical controller, actuates the robot on the basis of the result thus transformed.

However, according to the method mentioned, it becomes necessary to write a program for coordinate transformation in the robot operating program which is extremely complicated in practical use.

Even in a case where coordinate transformation is rendered expressible in a plain notation by modifying the programming language (e.g., in a case where the description relative to the transformation is expressed by a subroutine), the principle of operation remains unchanged since the robot is actuated on the basis of the sensed input image. Consequently, recognition of any article in the periphery of the image is hampered by the aberration of the lens and so forth to eventually require an expensive lens to attain a satisfactory high precision.

Although low-cost solid-state image pickup devices such as small-sized CCD area image sensors are available of late, it is occasionally necessary to employ, in low-luminance photography for example, a conventional image pickup device such as reticon tube. And in most cases some distortion is unavoidable in the periphery of the sensed image to consequently fail to meet the requirements of a high precision process.

For averting the above problems (intricacy in the programming and difficulties concerned with the image processing precision), it is necessary, in sensing the image, to place a subject or component part, which is to be assembled, at the center of the entire image. However, the conventional system known heretofore determines the operation of the robot based on the sensed image, so that when the robot is to be actuated for positively catching and photographing the subject at the center of the image, it is rendered impossible to directly indicate the desired displacement position to the center of the sensed image. In this case, it is necessary to calculate at predetermined time intervals the desired displacement position of the robot's manipulating end corresponding to the desired displacement position of the center of the image on the basis of the positional relationship between the camera and the robot's manipulating end, and then to write in the program a command for moving the manipulating end of the robot. Therefore, if a considerably long time is required for such calculation, it becomes impossible to shorten the processing time.

OBJECT AND SUMMARY OF THE INVENTION

It is an object of the present invention to provide an improvement in a robot numerical control apparatus which is capable of following an operation directed from a program and utilizing, in such program, the processed result of an image formed by a television camera disposed in the vicinity of a manipulating end of the robot. With regard to a displacement command for operating the robot by writing the coordinate value of a designated position, the present invention is so contrived as to select either a first command for displacing the robot's manipulating end to the designated position or a second command for displacing to the designated position the center of the image sensed by the camera means. Relative to the displacement of the image center executed in response to the second command, a coordinate transforming means is provided for controlling the movement of the robot's arm with pseudo control in a manner that the center of the sensed image is positioned at the manipulating end of a virtual arm whose support base is a segment from the center of the sensed image to the center of the articulation of the robot's arm equipped with the camera means.

According to one aspect of the present invention, there is provided a robot numerical control apparatus wherein a coordinate calculation command is prepared as one of commands in the program system for calculating the coordinate value of the manipulating end of the robot from the coordinate value of the center of the sensed image; and a coordinate calculating means is provided for calculating, in response to the coordinate calculation command, the coordinate value of the robot's manipulating end corresponding to the center of the image at the present instant from the positional relationship between the center of the sensed image and the robot's manipulating end.

According to another aspect of the present invention, there is provided a robot numerical control apparatus for controlling the operation of a robot equipped with a camera means on one of arms thereof. The apparatus comprises a memory for storing a program where the contents of operation of the robot are written; a coordinate transformer for transforming the coordinate value of a desired displacement position written in an orthogonal coordinate system to a coordinate value in an axial coordinate system representing the positional relationship between mutually adjacent arms; a program analyzer for reading out the program from the program memory and, after analyzing the same, supplying to the coordinate transformer the coordinate data of the desired displacement position with respect to either the manipulating end of the robot or the center of the sensed image; an arm data memory for storing the data relative to the length of each arm; a virtual arm data memory for storing the length of a virtual arm supported by a base corresponding to a segment from the center of the sensed image to the center of the articulation of the arm equipped with the camera means, and also storing the value of a deviation angle formed by the virtual arm and the arm equipped with the camera means; an adder/subtracter for adding or subtracing the value of the deviation angle stored in the virtual arm data memory, to or from the axial coordinate data outputted from the coordinate transformer; and a selector for selecting, in response to the instruction from the program analyzer, either the storage content in the arm data memory or the storage content in the virtual arm data memory as the arm data required for transforming the coordinate value of the desired displacement position from the notation in the orthogonal coordinate system to that in the axial coordinate system. In this constitution, when the program analyzer receives a displacement command relative to the image sensing center, the storage content in the arm data memory is selected by the selector as the data for each arm, and the data representing the length of the virtual arm is supplied to the coordinate transformer, while the data of the deviation angle relative to the virtual arm is supplied to the adder/subtracter, and a controlled movement of the arm is performed in accordance with the output of the adder/subtracter, thereby controlling the displacement of the image center with pseudo control in such a manner that the center of the sensed image is positioned at the manipulating end of the virtual arm.

In the present invention, pseudo control is so executed that the center position of the image sensed by the camera means is regarded as the position of the manipulating end of the virtual arm, whereby the coordinate value of the image center can be written in the displacement command with a feeling that the image sensing center of the camera is coincident with the manipulating end of the robot, hence eliminating the necessity of the program for coordinate transformation relative to exchange of the coordinate data between the image display unit and the numerical control apparatus. And a subject for assembly such as a component part at any position within the scope of the robot's motion can be caught at the center of the sensed image with another advantage of enhancing the image processing precision.

Out of the displacement commands for actuating the robot by describing the coordinate value of the designated position, there is selectively used either the first command for moving the robot's manipulating end to the designated position or the second command for displacing the center of the sensed image to the designated position, so that the center of the image can be displaced directly to the desired position with description of the coordinate value of the image center, thereby facilitating the programming while preventing the known drawback that the time required for coordinate transformation between the center position of the sensed image and the position of the robot's manipulating end is extremely prolonged.

The above and other features and advantages of the present invention will become apparent from the following description which will be given with reference to the illustrative accompanying drawings.

DESCRIPTION OF THE PREFERRED EMBODIMENTS

Hereinafter the robot numerical control apparatus of the present invention will be described in detail with reference to exemplary embodiments thereof shown in the accompanying drawings.

Before describing the constitution of the numerical control apparatus 1 of the present invention, an explanation will be given on an operation performed by a two-arm scalar robot (horizontal articulated two-arm robot) controlled by the apparatus 1.

Figure 4:
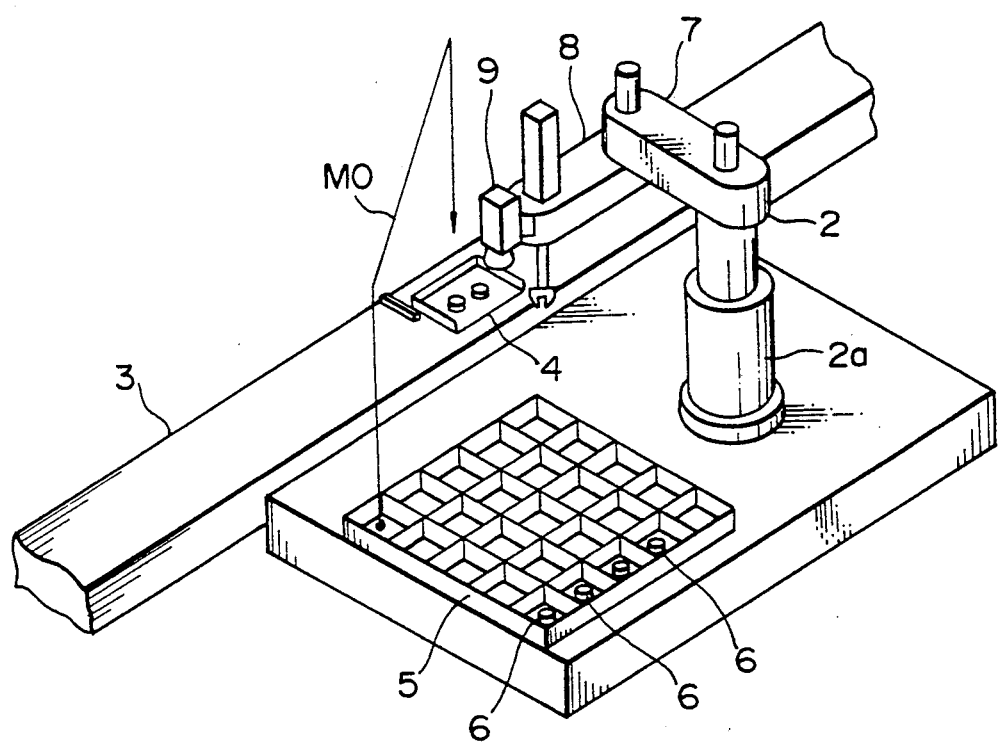
FIG. 4 is a perspective view schematically illustrating an exemplary operating state of the robot.

FIG. 4 is a perspective view illustrating an exemplary operation of a robot 2 which takes out one of component parts arrayed on a pallet and assembles the part to a workpiece.

In FIG. 4, reference numeral 3 denotes a transport path consisting of a conveyor to carry the workpiece 4. The workpiece 4 may be, for example, a cabinet of a radio receiver, a die-cast article or the like. Such workpiece 4 forwarded from another station is carried on the path 3 where component parts are assembled thereto.

Denoted by 5 is a pallet where component parts 6, 6 ... to be assembled to the workpiece 4 are arrayed within a predetermined area.

The robot 2 has a first arm 7 supported rotatably by a base 2 a, and second arm 8 attached rotatably to the first arm 7.

Denoted by 9 is a camera which is anchored to the fore end of the second arm 8 of the robot 2 and serves to form an image inclusive of the pallet 5 and so forth. The content of the image thus formed is analyzed by means of an unshown image processor.

On the basis of the result obtained from the image processor, the robot 2 determines a movement orbit MO of the gripped part 6 and performs its operation along the orbit.

The component parts 6, 6 ... on the pallet 5 are arrayed by an unshown automatic parts feeder. Therefore, due to some faulty operation or the like of such automatic parts feeder, there may occur a trouble that the component parts 6, 6 . . . on the pallet 5 fail to be supplied properly and cause dropouts. And in case the parts are circular such as rotary heads for use in a VTR, the parts may not be arrayed exactly in a predetermined direction.

The apparatus of the present invention is so contrived that, upon occurrence of such a fault, the image sensing center of the camera 9 is shifted to the desired position in response to a first command to rapidly catch the aspect of array of the component parts on the pallet, thereby facilitating the procedure of image pickup and measurement.

Now the mathematic premises in the present invention will be described below.

Figure 1:
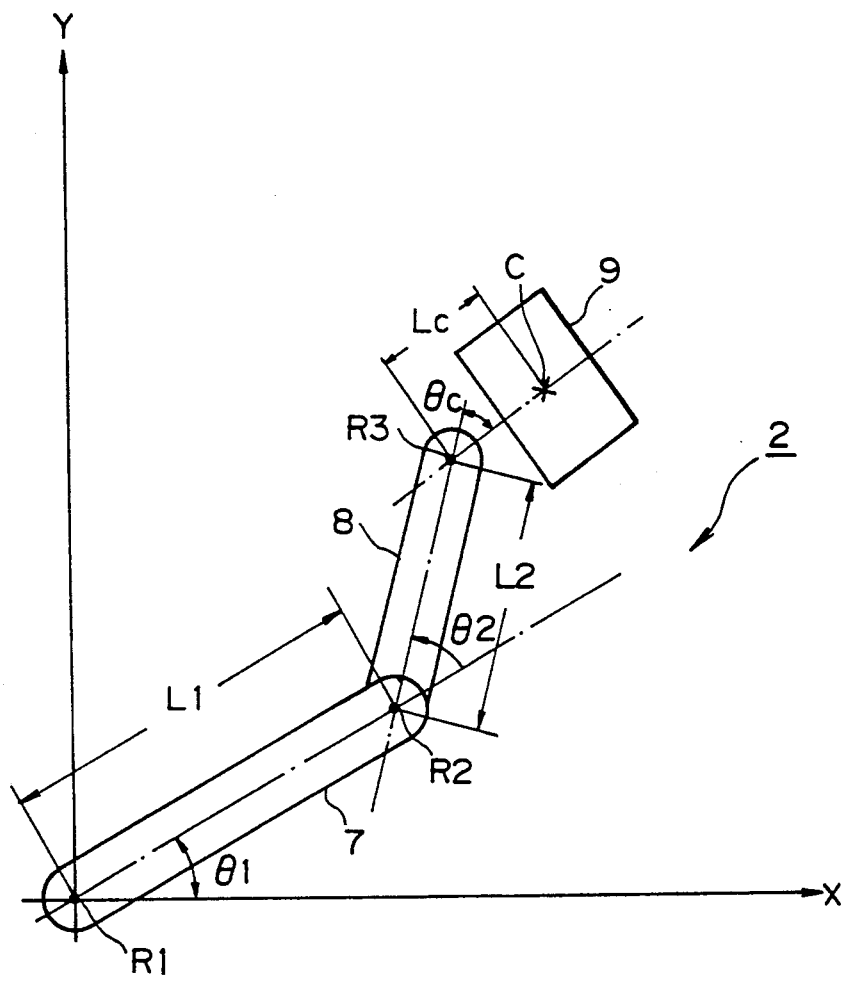
FIG. 1 is a plan view schematically showing the positional relationship between arms of a robot and the center of an image.

FIG. 1 is a schematic plan view of the robot 2 equipped with the camera 9 at the fore end of the second arm 8. The state of the robot 2 is represented by an orthogonal X-Y coordinate system where the horizontal axis is selected as the abscissa or X-axis while the vertical axis is selected as the ordinate or Y-axis.

In FIG. 1, L1 is the length of the first arm 7 (length of a segment from a connection center R1 of the first arm 7 and the base 2a to a connection center R2 of the first arm 7 and the second arm 8); and $\theta 1$ is the angle formed by the center line of the first arm 7 with the X-axis. Meanwhile, L2 is the length of a second arm 8 (length of the segment from the connection center R2 of the second arm 8 and the first arm 7 to a rotational axis R3 of a tool attached to the manipulating end of the second arm 8); and $\theta 2$ is the angle formed by the center line of the second arm 8 with the center line of the first arm 7. Further Lc is the length of a segment from the image sensing center of the camera 9 to the rotational axis R3 of the tool attached to the manipulating end of the second arm 8; and $\theta c$ is the angle formed by this segment with the center line of the second arm 8.

Suppose now that the coordinates of the image sensing center C of the camera 9 are (Xc, Yc). Then, from the geometric relationship between the arms 7, 8 and the camera 9, the center coordinates (Xc,Yc) can be expressed as $$X_c = L1 \cdot \cos\theta 1 + L2 \cdot \cos(\theta 1 + \theta 2) + L_c \cdot \cos(\theta 1 + \theta 2 + \theta_c)$$
$$Y_c = L1 \cdot \sin\theta 1 + L2 \cdot \sin(\theta 1 + \theta 2) + L_c \cdot \sin(\theta 1 + \theta 2 + \theta_c)$$
(1)

In Eq. (1), the constants L1, L2, Lc and $\theta c$ remain unchanged after being once determined.

Eq. (1) can be rewritten as Eq. (2) by developing cos ($\theta 1 + \theta 2 + \theta c$) to a term including ($\theta 1 + \theta 2$) and a term including $\theta c$ by the addition theorem of the cosine function, then developing sin ($\theta 1 + \theta 2 + \theta c$) to a term including ($\theta 1 + \theta 2$) and a term including $\theta c$ by the addition theorem of the sine function, and modifying the above by the composition rule of simple harmonic motion.

$$X_c = L1 \cdot \cos\theta 1 + LL \cdot \cos(\theta 1 + \theta 2 + \delta)$$
$$Y_c = L1 \cdot \sin\theta 1 + LL \cdot \sin(\theta 1 + \theta 2 + \delta)$$
(2)

$$LL = \sqrt{L2^2 + (2 \cdot L_c \cdot \cos\theta_c) \cdot L2 + L_c^2}$$

$$\delta = \tan^{-1} \frac{L_c \cdot \sin\theta_c}{L2 + L_c \cdot \cos\theta_c}$$

In Eq. (2), LL denotes the amplitude of the term cos ($\theta 1 + \theta 1 + \delta$) or the term sin ($\theta 1 + \theta 2 + \delta$); and $\delta$ denotes the deviation angle.

As will be understood from the fact that Lc and Sc take merely fixed values, Eq. (2) signifies that the system consisting of the second arm 8 and the camera 9 can be regarded as a virtual arm having a length LL and forming an angle ($\theta 2 + \delta$) with the center line of the first arm 7.

Figure 2:
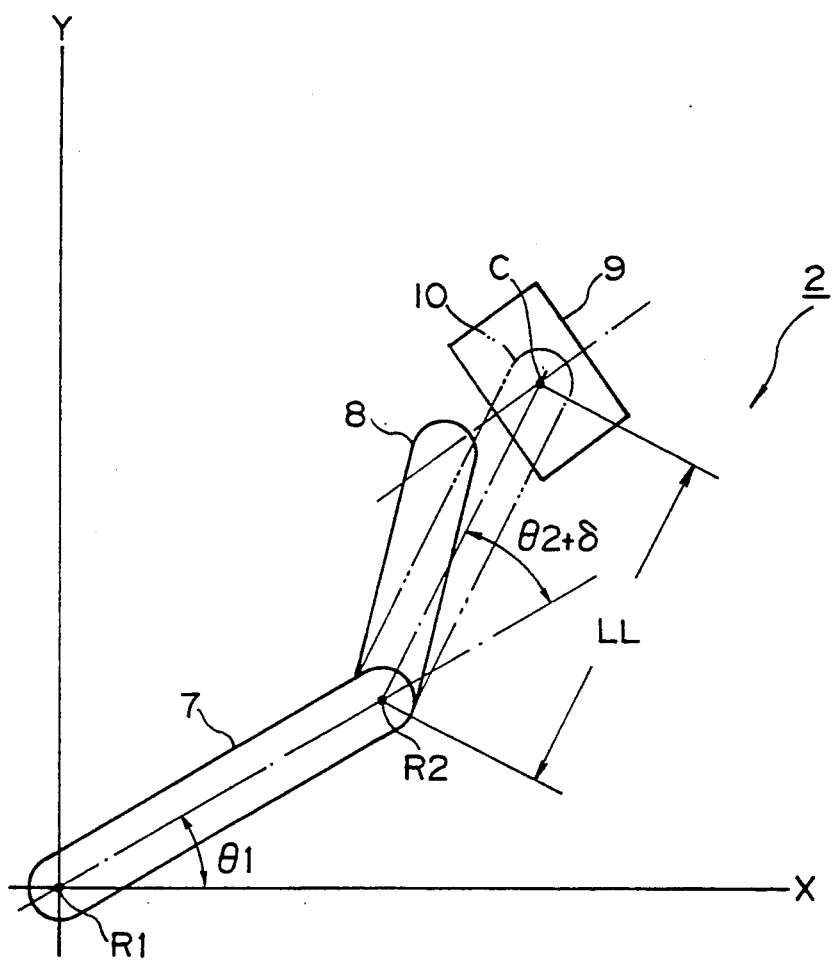
FIG. 2 is a schematic plan view for explaining that the image sensing center of a camera provided on a second arm can be regarded as the manipulating end of a virtual second arm.

More specifically, it can be assumed that a virtual arm 10 represented by a two-dot chained line in FIG. 2 is attached to the first arm 7 and also that the camera 9 is disposed at the fore end of the virtual arm 10. And a shift of the image sensing center of the camera 9 to a desired position is equivalent to a displacement of the manipulating end of the virtual arm 10 to a predetermined position. Considering the virtual arm in this manner, coordinate calculation can be executed by directly applying the coordinates of the image sensing center of the camera 9 to the coordinate transformation of the robot.

It is a matter of course that, in addition to the example of FIGS. 1 and 2 where the camera 9 is attached to the fore end of the second arm 8, the camera 9 may be attached to the first 7 as well and, in any robot having more than two arms, a replacement with a virtual arm is obtainable by a similar calculation.

Figure 3:
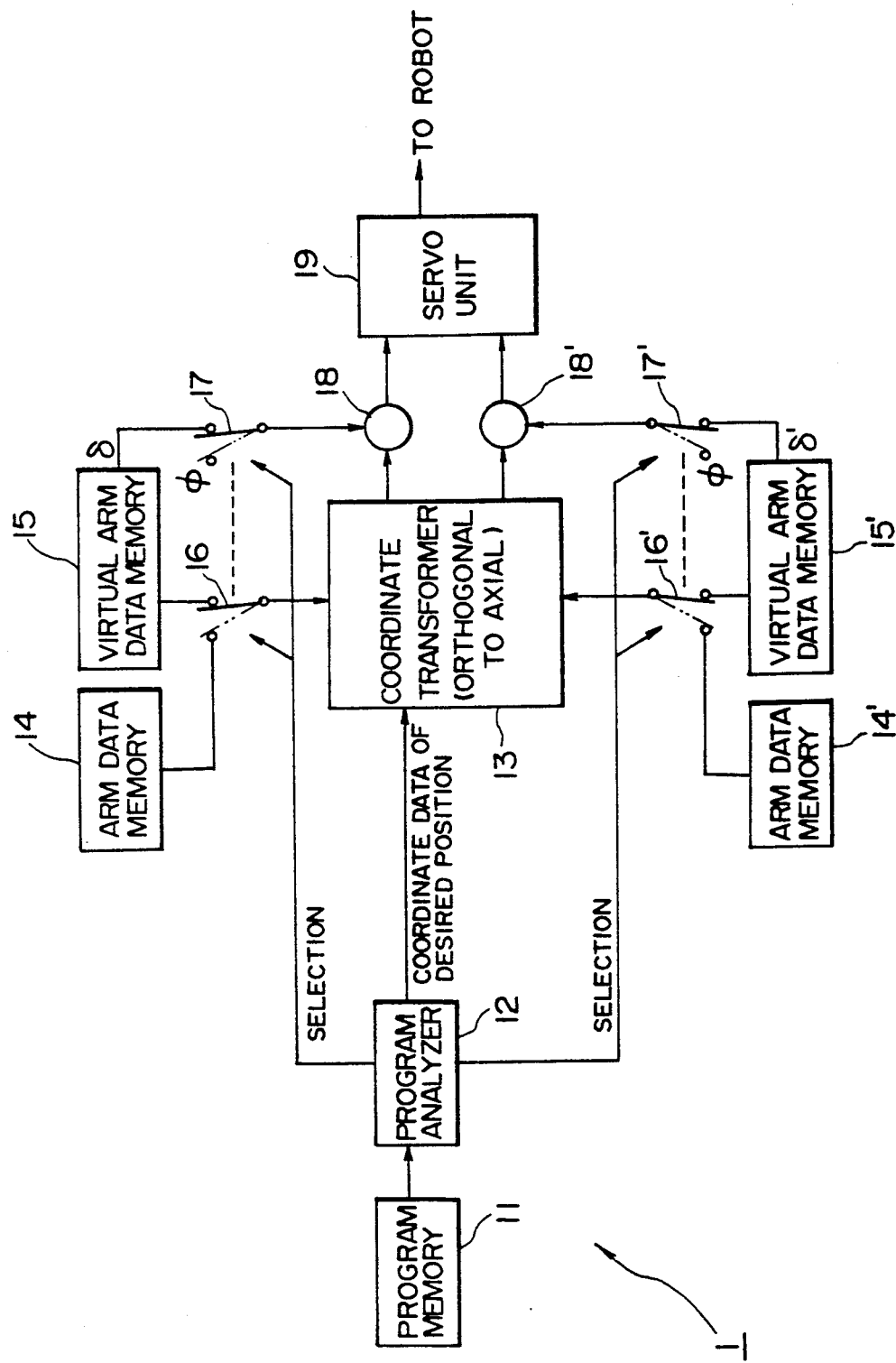
FIG. 3 is a function block diagram showing the constitution of a first embodiment which represents the robot numerical control apparatus of the present invention.

FIG. 3 shows the constitution of a first embodiment 1 representing the numerical control apparatus of the present invention accomplished on the basis of the mathematic premises mentioned. The process for replacing the desired position of movement of the virtual arm with that of the actual arm is executed practically by means of software. However, such process is visualized here as a block diagram so as to be understood with facility. This embodiment is so constructed that, in a scalar robot, the camera 9 can be disposed on either the second arm 8 or the first arm 7.

Denoted by 11 is a program memory for storing a program to direct a robotic operation. In the commands constituting the program, there are included a command for moving the manipulating end of the robot 2, a command for displacing the center of the sensed image to a desired position, and a command for designating the coordinate value of the virtual arm. The program may be stored in the form of either the ASCII code or a machine language.

Denoted by 12 is a program analyzer for analyzing the stored content in the program memory 11 and realizing the robotic operation in accordance with the result of such analysis. More specifically, for execution of a loop control command such as "for - next", calculation is performed merely in the analyzer. As for a robotic operation command relative to the operation of the robot, the coordinate value of the desired goal position is outputted to a coordinate transformer 13.

In response to the coordinates of the goal position received from the program analyzer 12 and expressed by an orthogonal coordinate system, the coordinate transformer 13 serves to transform the received coordinates to the axial coordinate system of the robot 2 (which describes the state of the arm by designating, with a parameter, the positional relationship between the mutually adjacent articulations). The data required for such coordinate trnasformation are stored in an arm data memory 14 and a virtual arm data memory 15.

In case the camera 9 is attached to the fore end of the second arm 8 of the robot 2, such two memories 14 and 15 are used to store the data relative to the arms and the position for attaching the camera.

More specifically, in the arm data memory 14, there is stored the data of the individual arms such as the length L1, L2 thereof and so forth.

Meanwhile in the virtual arm data memory 15, there is stored the data required to calculate the position of the manipulating end of the robot corresponding to the center of the output image of the camera 9. The data relative to the virtual arm 10 includes the length LL and the deviation angle $\delta$ thereof calculated according to Eq. (2). The constitution may be so modified as to store merely the values of Lc and $\theta c$ alone, and to calculate the length LL of the arm and the deviation angle $\delta$ from the stored values. However, it is not exactly adequate since the result of such calculation become fixed values, and therefore the above constitution increases the amount of calculation eventually.

The arm length data out of the entire data stored in both the arm data memory 14 and the virtual arm data memory 15 is supplied via the selector 16 to the coordinate transformer 13, while the deviation angle data is supplied from the virtual arm data memory 15 via the selector 17 to the adder/subtracter 18 in the rear stage of the coordinate transformer 13.

The switching control of the selectors 16 and 17 is performed by the program analyzer 12, which supplies a selection command signal to the selectors 16 and 17 respectively upon detection of an instruction written in the robot program for shifting the center of the image.

Then the coordinate transformer 13 selectively receives, as the arm length data for coordinate transformation, the stored content of the arm data memory 14 or that of the virtual arm data memory 15 and utilizes the data thus received.

In accordance with the state of the selector 17, the adder/subtracter 18 adds a predetermined deviation to or subtracts the same from the axial coordinate value obtained from the coordinate transformer 13. Here, the deviation value is either zero (denoted by $\phi$ in the diagram) or equal to the deviation angle $\delta$ stored in the virtual arm data memory 15.

The final axial coordinate value obtained from the adder/subtracter 18 is supplied to a servo unit 19 to become a control command signal for the robot 2.

Upon detection and interpretation of a shift instruction in the robot program for displacing the center of the output image of the camera 9, the program analyzer 12 supplies to the coordinate transformer 13 the desired coordinate value of the center position of the image while supplying the selection command signal to the selectors 16, 17 for selecting the storage content of the virtual arm data memory 15 so as to execute calculation of the position coordinates relative to the virtual arm 10, thereby achieving the state indicated by a solid line in FIG. 3.

Thus, the data relative to the length of the virtual arm 10 is supplied from the virtual arm data memory 15 to the coordinate transformer 13, while the data relative to the deviation angle $\delta$ is supplied from the virtual arm data memory 15 to the adder/subtracter 18, so that the axial coordinate value to be actually taken by each driving axis of the robot can be obtained from thm desired coordinate value of the virtual arm (in the orthogonal coordinate system).

Upon detection and interpretation of a shift instruction in the robot program for displacing the manipulating end of the robot, the program analyzer 12 supplies the desired coordinate value of the manipulating end to the coordinate transformer 13 while supplying the selection command signal to the selectors 16, 17 so as to obtain the arm data required for coordinate transformation, thereby achieving the state indicated by a two-dot chained line in FIG. 3. Consequently the data relative to the length of the actual arm is supplied from the arm data memory 14 to the coordinate transformer 13. Since a value zero is selected as the deviation in the adder/subtracter 18, it follows that the coordinate value of each driving axis is obtained in conformity with the desired goal coordinate value of the manipulating end of the robot 2.

A decision for selecting either a displacement of the center of the sensed image or a displacement of the manipulating end of the robot 2 can be written in the robot program, and a predetermined command for selection is supplied from the program analyzer 12 to the selectors 16 and 17 in accordance with the result of interpreting the instruction for such displacement.

In case the camera is used by attachment to the first arm 7, it is a matter of course that, similarly to another case where the camera is attached to the second arm 8, there may be provided an arm data memory 14', a virtual arm data memory 15', selectors 16', 17' for selecting the data in response to a selection command signal from the program analyzer 12, and further an adder/subtracter 18' in the rear stage of the coordinate transformer 13. In such a structure, the result of the calculation is delivered to a servo unit 19.

Figure 5:
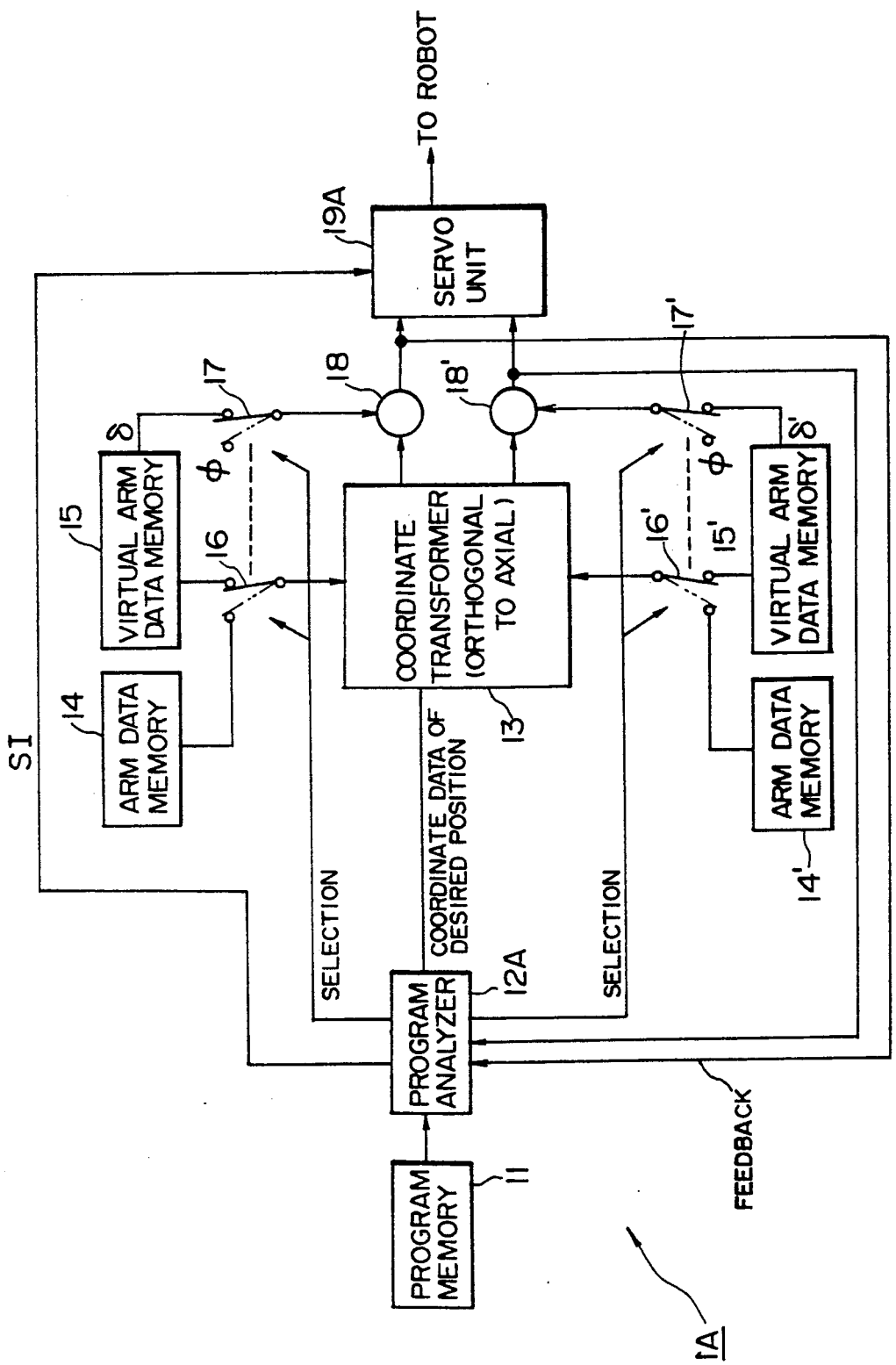
FIG. 5 is a function block diagram showing the constitution of a second embodiment which represents the robot numerical control apparatus of the present invention.

FIG. 5 shows the constitution of a second embodiment 1A representing the apparatus of the present invention.

The second embodiment 1A is so contrived as to employ the same principal component elements as those used in the foregoing first embodiment 1, wherein the coordinates of the robot's manipulating point can be obtained from the center coordinates of the sensed image in the robot program to consequently extend the degree of freedom in the program processing.

In the background of such request, there exist the following circumstances.

Figure 6:
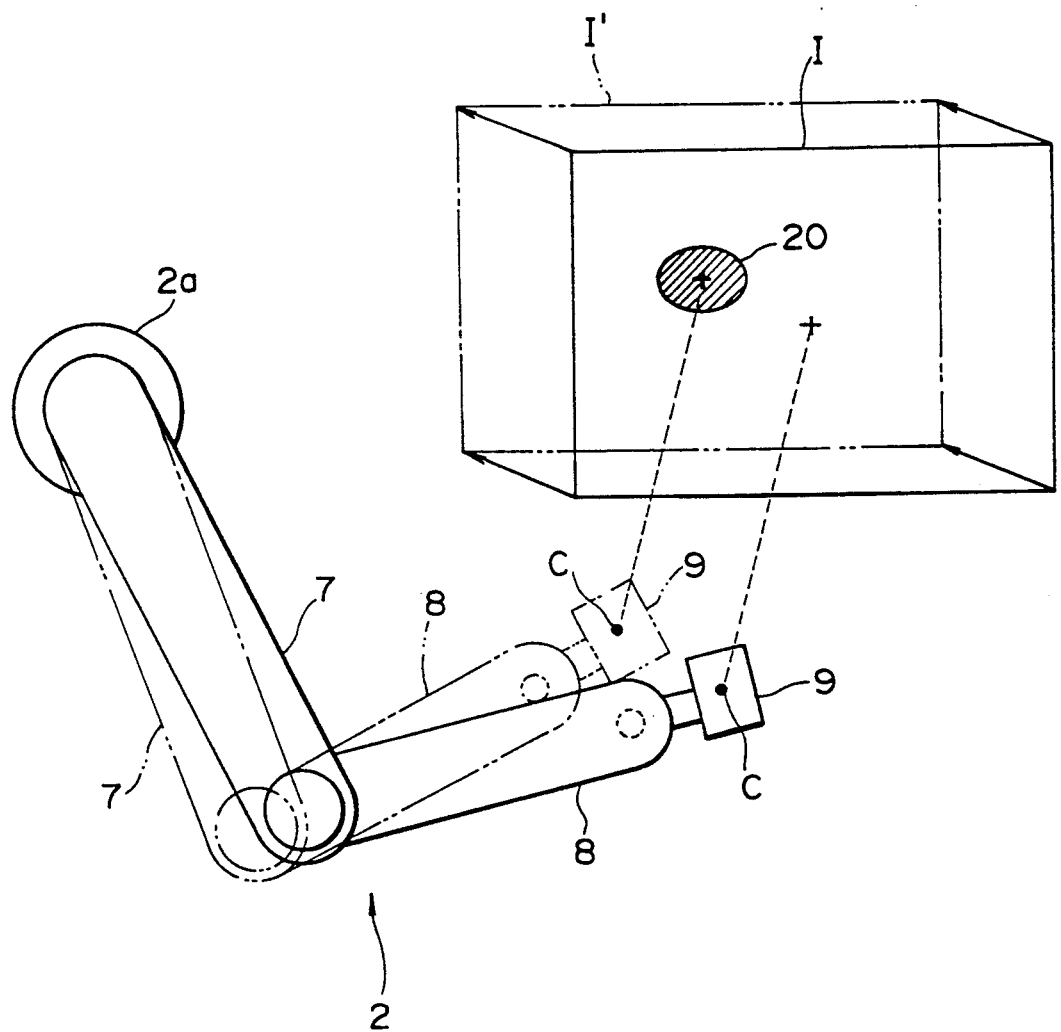
FIG. 6 illustratively explains the necessity of acquiring the coordinates of the robot's manipulating point from the coordinates of the center of the sensed image.

In the state of FIG. 6 where the manipulating end of the robot 2 has been displaced to its desired position, if a subject 20 being photographed is not coincident positionally with the center of the image I sensed by a camera 9 attached to the fore end of a second arm 8, it may be required to shift the manipulating end of the robot 2 so that the subject 20 is positioned exactly at the center of the image I'. In such a case, it becomes necessary to execute a process of detecting the present position by calculating the coordinates of the manipulating end of the robot 2 from the center coordinates of the sensed image.

Hereinafter the robot numerical control apparatus represented by the second embodiment will be described principally with respect to the points different from the aforementioned first embodiment 1. In FIG. 5, any component elements functionally equivalent to those used in the first embodiment are denoted by the same reference numerals, and a repeated explanation thereof will be omitted below.

Denoted by 12A is a program analyzer for outputting the coordinates of a desired goal position to a coordinate transformer 13 or supplying a selection command signal to selectors 16, 17 or 16', 17' to thereby control the flow of the data fed from arm data memories 14, 14' or virtual arm data memories 15, 15' to the coordinate transformer 13 or adder/subtracters 18, 18'. The program analyzer 12A further serves to supply a servo inhibit signal (SI) to a servo unit 19A.

The above inhibit signal SI is supplied not for inhibiting the entire operation of the servo unit 19A but for instructing the same not to use the next input data as control data for the robotic operation. In most cases a latch means for latching the data is incorporated in the input circuit of the servo unit, so that the servo inhibit signal SI is used for instructing such means not to latch the input data.

Accordingly it becomes possible to operate the coordinate transformer 13 merely as a calculating means.

When the selectors 16, 16', 17, 17' are placed in the state represented by solid lines in FIG. 5 where the virtual arm data memories 15, 15' are selected, the output value of the adder/subtracter 18 is the axial coordinate value of the second arm 8 obtained by coordinate transformation; and the output value of the adder/subtracter 18' is the axial coordinate value of the first arm 7 obtained by coordinate transformation. It follows therefore that an instruction for calculating the coordinates of the robot's manipulating end from the center coordinates of the sensed image can be realized with facility by feeding such axial coordinate value back to the program analyzer 12A. In case the process is not easy with respect to the axial coordinate system, it may be inversely transformed to a coordinate value of an orthogonal coordinate system.

In the robot numerical control apparatus in each of the above embodiments, writing the robotic operation in the program is facilitated by the use of a single image sensing instruction in the following manner, and it contributes to an effective execution of the instruction.

(1) Instruction for shifting window

A window function is capable of designating a specific region in the sensed image from the camera and limiting a target region of the image to be processed.

Therefore the processing speed can be raised by limiting the image region to be processed. Denoted by 21 in FIG. 7 is the entire image, wherein the limited region enclosed with a frame 22 is the designated one.

The window shifting function is further capable of changing the designated image region, which is to be processed, to another region. In such a case, it is preferred that the size of the region (i.e. the area of the image to be processed) can be changed as well.

Figure 7:
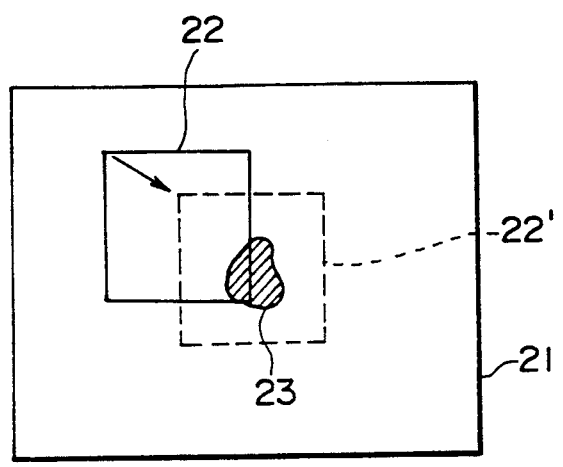
FIG. 7 illustrates a function for shifting a window.

According to this function, when the image portion 23 of a subject being photographed is caught merely partially in the image frame 22 initially designated as shown in FIG. 7, the image portion is shifted into the frame 22' so as to be caught at the center of the image region.

In the present invention, the center of the image can be shifted to a desired position and, upon completion of the shift to the desired position, the sensed image of the subject is supposed to be positioned in the proximity of the center of the image-forming focal plane.

Practically, however, it may occur occasionally that the subject fails to be caught at the center of the entire image due to some reasons including variations in the array of assembly parts.

In such a case, it is rendered possible by the above function to shift the window so that the subject to be processed is brought to the center of the image region.

According to the present invention, since the subject to be processed is not spaced far from the center of the image and is supposed to be positioned within a certain narrow range, the provision of such function is effective to minimize the required distance of movement in shifting the window and to execute image processing by the use of the image sensed in the region with minimal effect from any image distortion derived from any aberration or the like.

(2) Window instruction for deciding presence or absence

Figure 8:
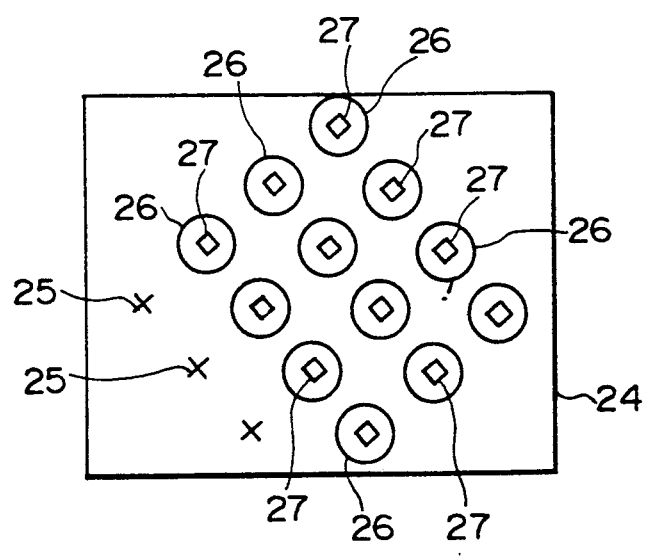
FIG. 8 illustrates a window function for deciding the presence or absence.

A window function relative to "presence/absence decision" is capable of setting, in a sensed image 24 shown in FIG. 8, small windows 26, 26 . . . at positions arranged like a lattice and spaced apart by fixed distances from predetermined reference points 25, 25 . . . , and acquiring the data such as areas of parts 27, 27 . . . caught in the small windows 26, 26 . . . . This function is needed to obtain high-precision data with facility in the numerical control apparatus of the present invention where the center of the image can be shifted to the specified position.

This function is adapted for processing the image at each lattice point by designating the reference points 25, 25 . . . and the size, shape, number and inclination of the arrayed small windows 26, 26 . . . , and is applicable to batch recognition of the entire assembly parts on a parts feeding pallet for example.

If any conventional robot having the known image processing function is additionally equipped with the above function, it has been impossible heretofore to prescribe the image forming center, so that there exist difficulties in setting such small windows 26, 26 . . . in the image processing relative to the presence of a multiplicity of assembly parts arrayed on the pallet.

Thus, due to the compulsory adoption of the method that sequentially recognizes the assembly parts one by one, the required processing time is prolonged, thereby eventually increasing the contact time.

However, according to the present invention where the image sensing position can be settled, the entire pallet is recognizable by using this function merely once to consequently shorten the required processing time.

(3) Instruction for deciding contact with window

Figure 9:
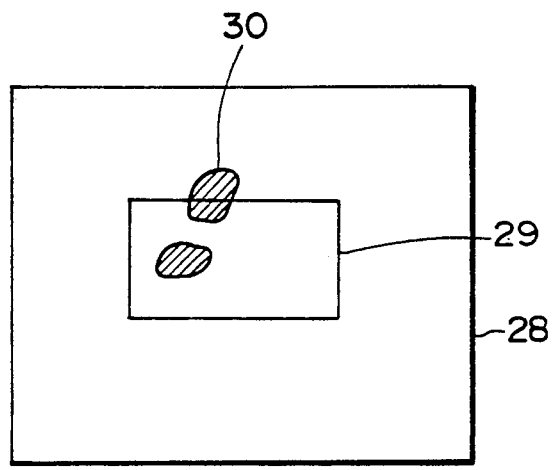
FIG. 9 illustrates a function for deciding contact with the window.

A decision function relative to "contact with window" is capable of making a decision as to whether, in FIG. 9 for example, an image portion 30 of a subject to be processed is in contact or not with the peripheral region of a window 29 designated in a sensed image 28.

This function can be utilized when judging whether the subject to be processed is positioned within the designated region or not.

However, if the image sensing center is not defined, it is difficult to define the position of the region to be processed, whereby the detection reliability is lowered.

According to the present invention where the region to be processed is positionally definable by the instruction to shift the center of the image, the decision can be made with high reliability.

(4) Instruction for detecting cavity-inclusive centroid

A cavity-inclusive centroid detecting function is capable of detecting the centroid of a subject article in a case where any partially non-detecting region is surrounded with an article detecting region, by regarding the partially non-detecting region as the article detecting region. More specifically, this function supplements any dropout of the image data relative to the subject article and executing the image process by regarding such dropout as the presence of the subject article.

Figure 10:
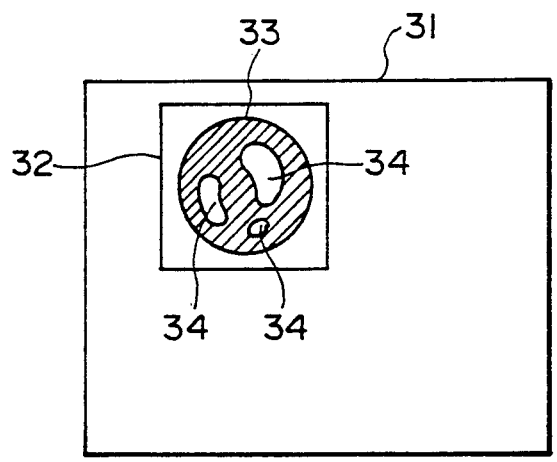
FIG. 10 illustrates a function for detecting the cavity-inclusive centroid.

In recognizing a VTR head drum for example, there may occur a state of FIG. 10 where partial image dropouts 34, 34 . . . are induced in the image 33 of the head drum caught in the window 32 of the sensed image 31. Such dropouts are caused due to the condition of illumination or the intrinsic shape of the assemble part.

In recognition of the head drum, it may be necessary to calculate the centroid with respect to the circumference of the sensed head drum image. Although this function is usable in such a case, if the region to be processed is not definite, the centroid detection needs to be performed over a wide area to further increase calculation time.

In case the image sensing center is settled in response to the shifting instruction to the center of the image as in the present invention, it becomes possible to set a window for the minimum necessary region to eventually meet the requirements for expedited processing.

According to the present invention, as described hereinabove, the recognition accuracy can be enhanced by shifting the position of the image sensing center as the manipulating end of the virtual arm under pseudo control and thereby catching the subject, which is being photographed, at the center of the sensed image. And it is possible to shorten the time required until the subject, which is being photographed by the robot, is finally brought into the view field of the camera, hence minimizing the tact time in a high-precision work.

Furthermore, an instruction for a shift to the center of the image can be written in the program to thereby facilitate the robot programming as well as to comply rapidly with any change of a product to be manufactured.

In addition, some image processing instructions can be efficiently executed by easily sensing an image at the desired position.

What is claimed is:

1. A robot numerical control apparatus for following an operation directed from a program and utilizing, in said program, the result of processing an image obtained by a camera attached to an arm of a robot, comprising:
    means for selecting as a displacement command a first command for displacing a manipulating end of said robot to a dsignated position or a second command for displacing the center of an output image of said camera to the designated position to actuate the robot in response to a coordinate value of the designate position, and
    a coordinate transforming means for controlling the movement of the robot's arm with pseudo control in such a manner that, when said second command is selected, the center of the sensed image is positioned at the manipulating end of a virtual arm measured from the center of the sensed image to the center of an articulation of the robot's arm equipped with said camera.

2. A robot numerical control apparatus for following an operation directed from a program and utilizing, in said program, the result of processing an image obtained by a camera attached to an arm of a robot, comprising:
    means for generating a coordinate calculation command to calculate a coordinate value of a manipulating end of the robot relative to a coordinate value of the center of a sensed image obtained by the camera, and
    a coordinate calculating means for calculating, in response to said coordinate calculation command, the coordinate value of the manipulating end of the robot corresponding to the center of the sensed image at predetermined time intervals based on a positional relationship between the center of the sensed image and the manipulating end of the robot.

3. A robot numerical control apparatus for controlling the operation of a robot equipped with a camera on one of a plurality of arms thereof for sensing an image, comprising:
    a memory for storing a program wherein instructions for operation of said robot are written;
    a coordinate transformer for transforming coordinate data of a desired displacement position expressed by an orthogonal coordinate system to a coordinate value expressed by an axial coordinate system which represents a positional relationship between mutually adjacent arms and for outputting axial coordinate data;
    a program analyzer for retrieving the program from said memory, for analyzing the program, and for supplying to said coordinate transformer the coordinate data of the desired displacement position with respect to either a manipulating end of the robot or the center of a sensed image;
    an arm data memory for storing data relative to the respective lengths of said plurality of arms;
    a virtual arm data memory for storing data representing the length of a virtual arm measured from the center of the sensed image to the center of articulation of the arm equipped with said camera, and also for storing data representing the value of a deviation angle formed by said virtual arm and said arm equipped with said camera;
    an adder/subtractor for adding or subtracting the value of the deviation angle stored in said virtual arm data memory, to or from the axial coordinate data outputted from said coordinate transformer; and
    a selector for selecting, in response to the coordinate data supplied from said program analyzer, either the content of said arm data memory or the content of said virtual arm data memory as the arm data to be supplied to said coordinate transformer;
    whereby, when said program analyzer receives a displacement command relative to the center of said sensed image, the content of said arm data memory is selected by said selector, and said virtual arm length data is supplied to said coordinate transformer, while said virtual arm deviation angle data is supplied to said adder/subtractor to control movement of the arm, thereby controlling the displacement of the image center with pseudo control in such a manner that the center of the sensed image is positioned at the manipulating end of said virtual arm.

* * * * *

UNITED STATES PATENT AND TRADEMARK OFFICE
CERTIFICATE OF CORRECTION

PATENT NO. : 5,305,427
DATED : April 19, 1994
INVENTOR(S) : Yasuyuki Nagata

It is certified that error appears in the above-indentified patent and that said Letters Patent is hereby corrected as shown below:

Col. 6, line 2, change "(θ1+θ1" to --(θ1+θ2--
Col. 7, line 63, change "thm" to --the--

Col. 11, line 42, change "dsignated" to --designated--
  line 46, change "ignate" to --ignated--

Signed and Sealed this

Thirty-first Day of October 1995

Attest:

BRUCE LEHMAN

*Attesting Officer*    Commissioner of Patents and Trademarks